United States Patent

[11] 3,591,293

| [72] | Inventors | Robert E. Maltby, Jr.<br>Perrysburg;<br>Walter D. McComb, Oregon, both of, Ohio |
|------|-----------|---|
| [21] | Appl. No. | 019,543 |
| [22] | Filed | Mar. 19, 1970 |
| [45] | Patented | July 6, 1971 |
| [73] | Assignee | Libbey-Owens-Ford Company<br>Toledo, Ohio<br>Continuation of application Ser. No.<br>458,995, May 26, 1965, now abandoned. |

[54] APPARATUS FOR DETERMINING THE THICKNESS OF A TRANSPARENT MATERIAL BY MEASURING THE TIME INTERVAL BETWEEN IMPINGEMENT OF FRONT AND BACK SURFACE REFLECTIONS ON A DETECTOR
11 Claims, 12 Drawing Figs.

[52] U.S. Cl. .................................................. 356/161,
250/219 TH
[51] Int. Cl. ............................................. G01b 11/02
[50] Field of Search ........................................ 250/129
TH; 356/239, 157, 158, 159, 120, 161

[56] References Cited
UNITED STATES PATENTS

| 2,892,948 | 6/1959 | Frantz | 88/1 (HVS) UX |
|-----------|--------|--------|---------------|
| 2,950,428 | 8/1960 | Gievers | 88/1 (HVS) X |
| 2,998,745 | 9/1961 | McClellan | 88/14 (EG) |
| 3,033,991 | 5/1962 | Sampson | 88/1 (HVS) X |
| 2,892,948 | 6/1959 | Frantz | 250/202 |
| 2,998,745 | 9/1961 | McClellan | 356/161 |

Primary Examiner—Ronald L. Wibert
Assistant Examiner—Orville B Chew, II
Attorney—Nobbe & Collins ABSTRACT: Monitoring physical characteristics such as thickness, index of refraction, width, and position of a moving transparent member having spaced optical surfaces by projecting a restricted beam of light at an angle incident to produce spaced, reflected beams from the optical surfaces, focusing the spaced reflected beams at a point spaced from the member, and successively activating means electrically responsive to the spaced reflected beams to produce corresponding electric signals whose separation in time is indicative of the physical characteristic.

PATENTED JUL 6 1971 3,591,293

INVENTORS
Robert E. Maltby, Jr. and
BY Walter D. McComb
Nobbe & Swope
ATTORNEYS

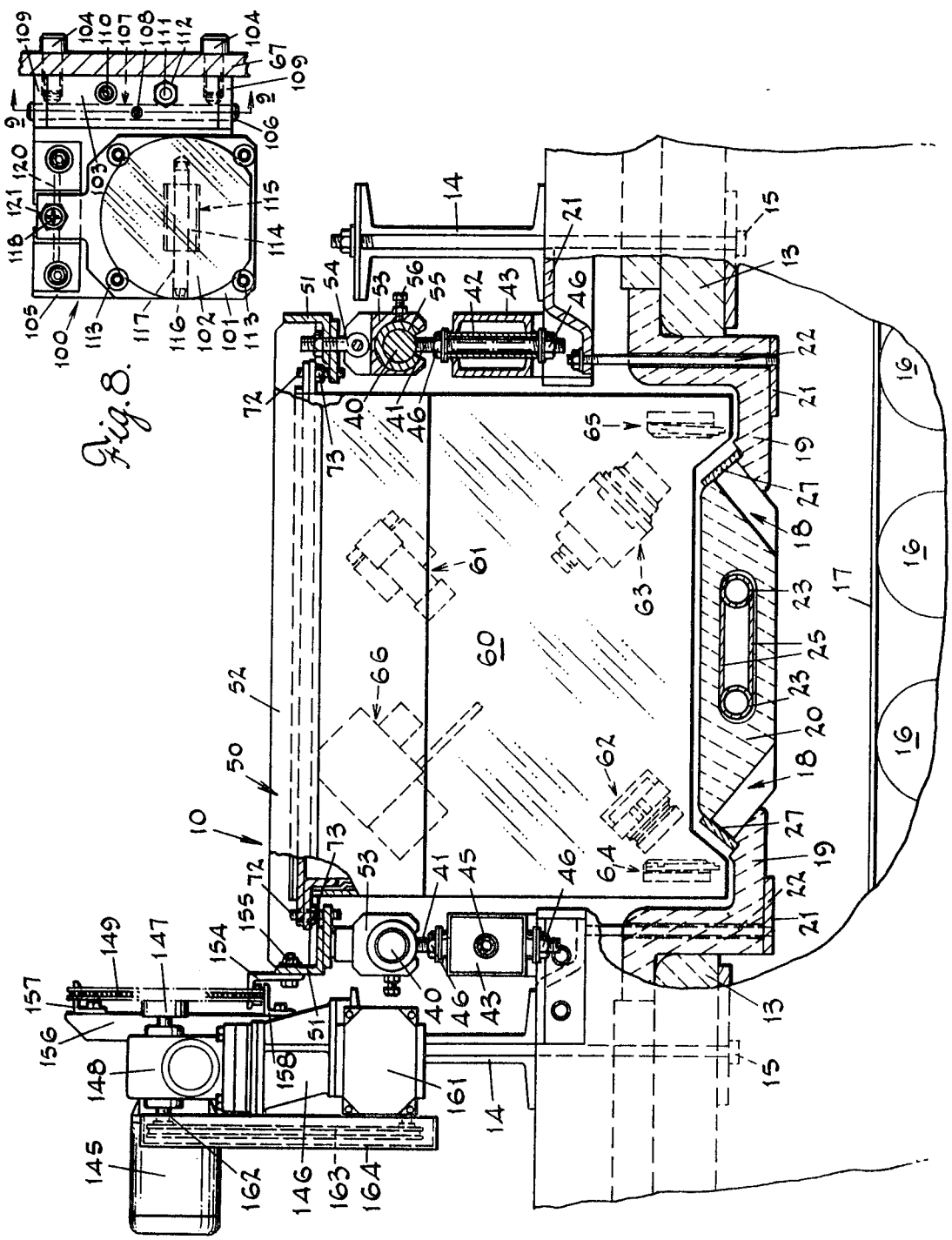

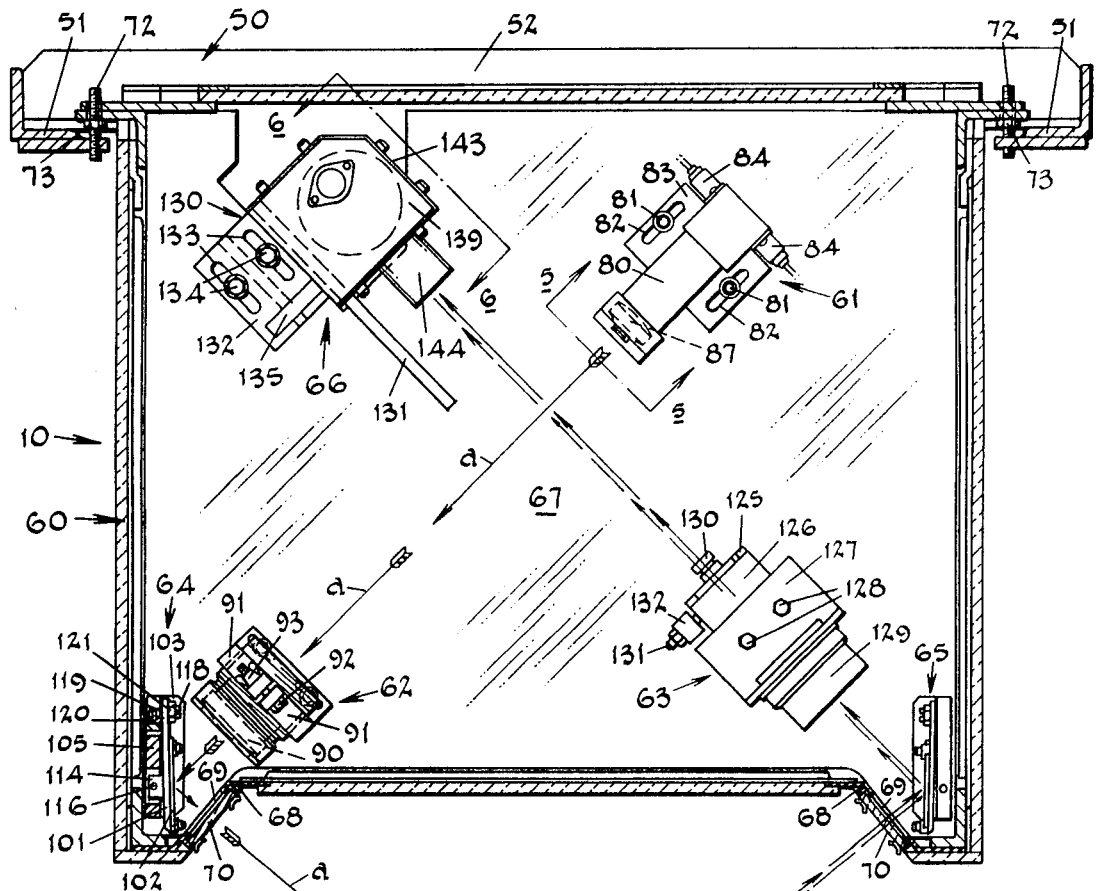

APPARATUS FOR DETERMINING THE THICKNESS OF A TRANSPARENT MATERIAL BY MEASURING THE TIME INTERVAL BETWEEN IMPINGEMENT OF FRONT AND BACK SURFACE REFLECTIONS ON A DETECTOR

This application is a continuation of Ser. No. 458,995 filed May 26, 1965 and now abandoned.

This invention relates to inspection devices of the optical type, and more particularly to an improved device for determining physical characteristics of a transparent member.

The primary object of this invention is to provide a novel inspection device for indicating physical characteristics of a transparent sheet, as the sheet is being moved along a supporting surface in an enclosed area.

Another object is the provision of an optical measuring device or instrument that is capable of accurately determining the thickness or index of refraction of a transparent member.

A further object is the provision of novel apparatus for monitoring the thickness and/or width and position of a moving glass ribbon.

A still further object is the provision of a traversing apparatus including an inspection device which will continually monitor physical characteristics, such as thickness and/or width and position, of a glass ribbon as it is moving in the lehr of a glassmaking machine.

Other objects and advantages of the invention will become more apparent during the course of the following description when read in connection with the accompanying drawings.

In the drawings, wherein like numerals are employed to designate like parts throughout the same:

FIG. 3 is a fragmentary side elevation of the lehr and inspection device with parts thereof being in section;

FIG. 4 is a sectional view of the inspection device per se;

FIG. 5 is a view taken along lines 5-5 of FIG. 4;

FIG. 6 is a view taken along lines 6-6 of FIG. 4;

FIG. 7 is a fragmentary view showing the mounting means for the transparent members of the inspection device;

FIG. 8 is a detailed view of the mirror mounting means;

Figure 2:
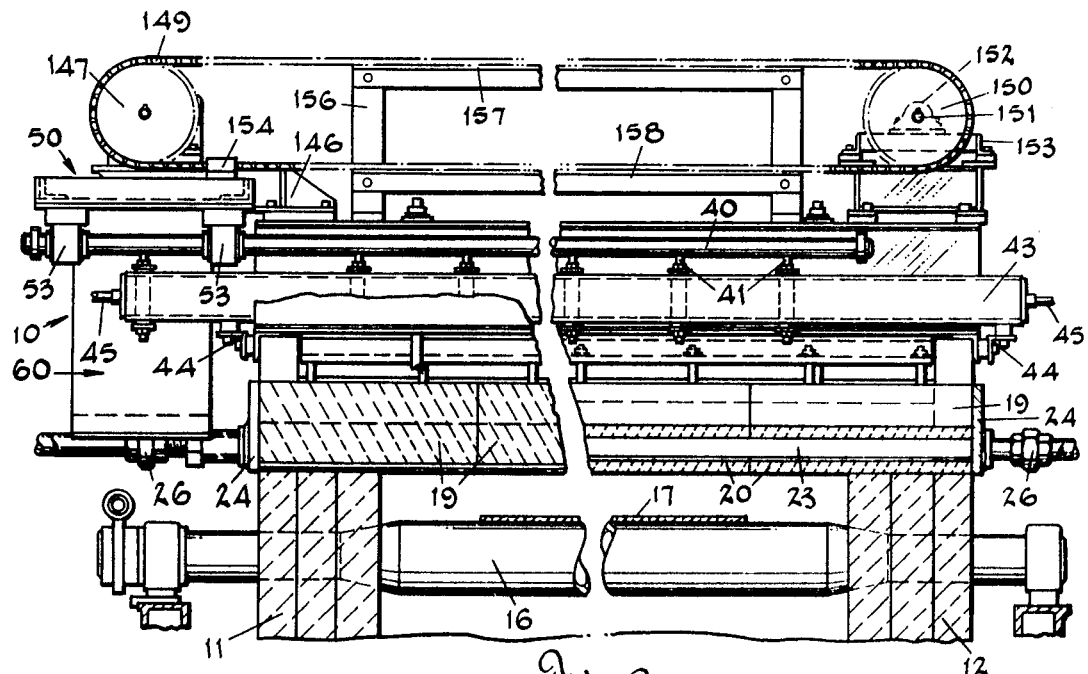
FIG. 2 is a transverse vertical fragmentary view taken along lines 2-2 of FIG. 1.

There are many prior art inspection devices for optically measuring the thickness of a transparent member having spaced optical surfaces. However, none of these has been capable of rapidly and accurately monitoring the thickness of a glass ribbon, immediately after being formed, as it is moving in the annealing lehr of a window or float glassmaking machine. The high temperatures required in the entrance end of the lehr of a glassmaking machine and the practical limitations of locating apparatus adjacent the glass surface dictate that any inspection device utilized in this area must be placed in a considerable distance from the surface of the newly formed glass ribbon to be capable of being sufficiently insulated from the high temperature therein. Therefore, any error resulting from wedge, i.e. nonparallel surfaces, in the glass ribbon is increased because of the distance between the ribbon surface and the detection apparatus of the optical inspection device. This invention eliminates substantially all errors resulting from wedge in a glass ribbon by utilizing lens systems between the glass ribbon surface and the light beam source and the detection apparatus of the optical device which will image the beam and the detection apparatus at the surface of the glass ribbon.

In accordance with this invention, there is provided a traversing self-contained inspection device for measuring the thickness of a transparent sheet member as it is moving along a supporting surface of a lehr. The inspection device includes a source and means for projecting a beam of light, linear in cross section, toward and at an angle to the surface of a glass sheet so that spaced parallel images of the linear beam are reflected from the opposite surfaces of the sheet toward and into a chopper assembly.

A first lens system is located in the path of light beams to form an optical image of the linear beam at the near surface of the ribbon. A second lens system is interposed in the path of the spaced reflections between the near surface of the glass and the entrance of the chopper assembly so that an optical image of the entrance of the assembly is produced at the near surface of the glass. The chopper assembly includes a detection means responsive to the reflected beams which is placed in the path of the reflections with a rotating opaque member having an opening therein also located in the path of the reflections which will allow the first and second reflected beams to consecutively pass through the opening to the detection means producing spaced pulses which are a function of sheet thickness. The pulses produced by the detection means are differentiated and supplied through appropriate electrical apparatus to suitable recording or readout equipment to indicate the sheet thickness.

In a preferred embodiment, the elements of the inspection device are placed in an enclosed casing which is mounted for traversing movement adjacent the roof of an annealing lehr of a glassmaking machine and may also be provided with a potentiometer driven by the driving mechanism for the inspection device which combined with selected pulses from the detection means is connected to suitable recording equipment for continually checking the width and position of the moving glass ribbon within the lehr.

Figure 1:
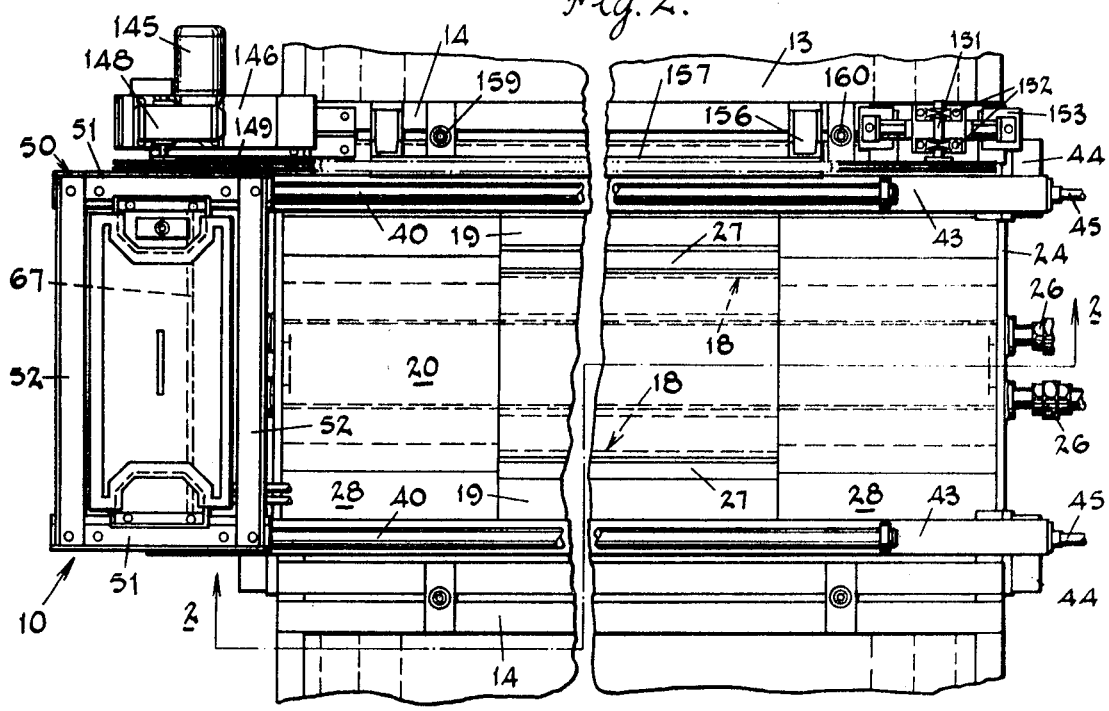
FIG. 1 is a fragmentary top plan view of a portion of an annealing lehr having mounted thereon an inspection device constructed in accordance with this invention.

With particular reference to the drawings, there is shown in FIGS. 1 to 3, a portion of an annealing lehr of a glassmaking machine having mounted thereon the novel inspection device 10, constructed in accordance with the invention. The lehr includes sidewalls 11 and 12 and a roof 13 supported by crossbeams 14 and secured thereto by bolts 15. A plurality of rolls 16 extend through the sidewalls of the lehr and support a newly formed glass sheet or ribbon 17 moving therein.

The roof of the lehr is provided with a transversely extending elongated opening having Z-shaped insulating members 19 (FIG. 3) covering a portion of the opening. The Z-shaped members are supported on the crossbeams through the brackets 21 and bolts 22. The inspection device is further insulated from the inside of the lehr by means of central insulating sections 20 which are supported in spaced relation between opposed Z-shaped members by pipes 23 that are held on opposite sides of the lehr by plates 24 and divide the elongated opening between the Z-shaped members into two narrow slots 18. The pipes are spaced with respect to each other by plates 25 rigidly secured thereto with the opposite ends of the tubular members being provided with suitable couplings 26 for supplying a cooling fluid therethrough.

The elongated slots 18 in the roof of the lehr are covered with suitable heat-resistant transparent members 27 to completely enclose the interior of the lehr from the surrounding atmosphere. Blocks, such as shown at 28 in FIG. 1, supported on the sidewalls of the lehr may be provided at opposite ends of the elongated slots to provide additional support for the structure forming the elongated slots.

The inspection device 10 is supported above the elongated slots 18 by guide rods 40 having spaced threaded rod portions 41 extending through sleeves 42 in hollow housings 43 with the housings being secured in spaced relation above the lehr roof by brackets 44 secured to the crossbeams 14. The guide rods are adjustable above the lehr through pairs of locknuts 46 threaded on each rod portion 41 and engaging opposite ends of the sleeves 42. The housings 43 are also provided with couplings 45 at opposite ends thereof to circulate a cooling fluid through said housings.

The inspection device or instrument is supported on a rectangular frame 50 including two spaced pairs of angle members 51 and 52 with the frame having a plurality of C-shaped bearing blocks 53 secured to one side thereof by means of securing devices 54. The bearing blocks have bearing surfaces 55 mounted therein which are held in position by setscrews 56 and are slidably received on the guide rods 40. The inspection device 10 is adjustably secured to the frame 50 by threaded members 72 and a locknut 73.

The inspection device or optical instrument is best shown in FIG. 4 and includes a casing 60 and an optical system having a light source assembly 61, first and second lens assemblies 62 and 63, first and second mirror assemblies 64 and 65, and a chopper assembly or detection apparatus 66 with the elements of the optical system all mounted on a support plate 67 suspended from the top wall of the casing and spaced from the sidewalls thereof. The bottom of the casing is recessed to provide two angular wall sections 68 each having an opening 69 therein. The openings are covered with transparent members 70 received in recesses surrounding the opening and retained therein by spring clips 71.

As shown in FIGS. 4 and 5, the light source assembly includes a tubular member 80 secured to the wall of the casing by securing devices 81 extending through elongated slots 82 of a bracket support 83. One end of the member has a light source or lamp 84 mounted thereon while the other end is provided with a mask 85 having an elongated slit 86 therein with a lens 87 located between the mask and the light source, for a purpose to be described later.

The above light source assembly will project a linear beam of light along a path indicated by the arrows $a$ of FIG. 4. The lens assembly 62 positioned in the path of the projected beam includes a lens system 90 which is secured to the plate 67 by a bracket having two C-shaped arms 91 and a bolt 92 with a wingnut 93 for releasably holding the lens system in position. The lens system is located in the path of the light beam midway between the mask 85 and the near surface of the sheet $s$, for a purpose to be described later.

Figure 9:
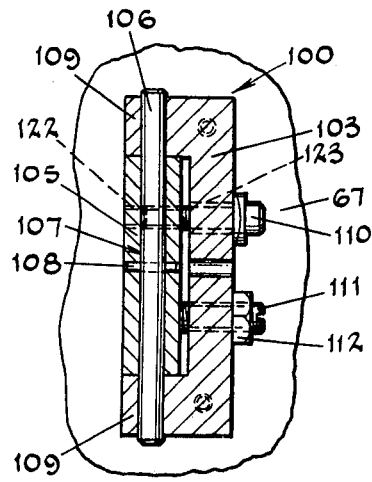
FIG. 9 is a sectional view taken along lines 9-9 of FIG. 8.

The first and second mirror assemblies 64 and 65 are positioned in the path of the projected and reflected linear beams, respectively. Since one assembly is a mirror or reversed image of the other, only one will be described in detail. As shown in FIGS. 4, 8 and 9 the mirror assembly includes a mounting bracket 100, a mounting plate 101 and a mirror 102. The mirror-mounting bracket 100 has a first bracket portion 103 secured to the support plate 67 by securing devices 104 with a second bracket portion 105 pivotally mounted on the first bracket portion by a pin 106 which is held in an opening 107 of the second bracket portion 105 by a setscrew 108 with the opposite ends of the pin extending through openings in the legs 109 of the first bracket portion.

A first securing device 110 extends through an enlarged opening 123 in the first bracket portion and is threadedly received in an opening 122 in the integral extension of the second bracket portion while a setscrew 111 having a locknut 112 is received in a threaded opening of the first bracket portion and engages the surface of the integral extension. The above arrangement allows for minute pivotal adjustment of the second bracket portion with respect to the first bracket portion.

The mirror 102 is engaged on one surface of the mounting plate 101 and is held thereon by screws 113 while the opposite surface of the plate is provided with a lug 114 having a circular opening therein. The lug is positioned in a rectangular recess 115 in the second bracket portion 105 while the opening of the lug pivotally receives a first dowel pin 116 mounted in the opening 117 of the second bracket portion.

The upper portion of the mounting plate 101 has a projection which threadedly receives an adjustment screw 118 having a semicircular groove 119 adjacent one end thereof which engages a portion of a second dowel pin 120 in the upper portion of the second bracket portion 105. The adjustment screw is provided with a locknut 121 for engaging one surface of the projection and lock the adjustment screw in position.

This mirror assembly will allow for minute two directional adjustment of the mirror to direct the projected beam at a desired angle onto the glass surface, for a purpose to be described later.

The second mirror assembly 65, a mirror image of the mirror assembly 64, is mounted on the support plate 67 and in the path of the spaced beams reflected from the glass sheet $s$ to redirect the reflected beams through the second lens assembly 63 toward the chopper assembly 66.

The second lens assembly 63 includes a lower base 125 secured to the support plate 67, an upper base 126 slidable on the lower base having an angle member 127 mounted thereon by bolts 128 with a lens holder 129 received in an opening in one leg of the angle member 127. The lower base is provided with an adjustment screw 130 to adjust the upper base plate thereon with the upper base plate being held in adjusted position by a setscrew 131 extending through a lug 132 mounted on the support plate 67.

The chopper assembly or detection apparatus 66 is mounted on a support 130 including an L-shaped base 131, with a flange 132 extending from one surface of the base which has elongated slots 133 for receiving bolts 134 mounting the support on the support plate 67. A gusset plate 135 is provided to rigidify the support.

A synchronous motor 136 having an opaque circular ring or tubular member 137 secured to the shaft thereof is mounted on the base and the ring or wheel is provided with an elongated slit 138. A support plate 139 is secured to the base of the support and extends therefrom adjacent the circular ring. A photomultiplier 140 connected to a high-voltage power supply is mounted on the support plate and extends inside the circular ring or wheel adjacent one side thereof with a lens holder 141 having lens 142 therein mounted on the support plate spaced from the photomultiplier and extending into the circular ring or wheel adjacent the opposite side thereof. The wheel, photomultiplier and lens holder are enclosed by a suitable cover 143 to restrict the amount of light adjacent the outside of the wheel and the cover is provided with an opening having a tubular member 144 extending from the cover to allow the reflected beams to impinge on the photomultiplier through the rotating slit 138.

The traversing mechanism for the inspection device includes a reversible electric motor 145, mounted on a support 146 which is secured to and extends from one end of the crossbeam 14. The reversible motor is connected to a drive sprocket 147 through a suitable gearbox 148, mounted on the support 146.

A drive chain 149 is trained over the drive sprocket 147 at one end and over an idler sprocket 150 having a shaft 151 rotatably received in a bearing block 152 which is adjustably mounted on a support 153 at the opposite end of the crossbeam 14. The drive chain is connected to the frame 50, by an angle member 154, secured to the frame by a bolt 155.

The two flights of the drive chain 147 are supported intermediate the sprockets by a support frame 156 including angle members 157 and 158 adjacent the upper and lower flights, respectively. Limit switches 159 and 160 are mounted on the cross beam 14 and connected to the motor 145 to limit the transverse movement of the inspection device above the lehr.

As is shown in FIG. 4, the inspection device provides a linear beam of light incident at an angle ($\Phi$) which is directed towards the moving surface of the glass along the arrows $a$ and reflected from the spaced optical surfaces of the glass ribbon $s$, along spaced lines indicated by the arrows $b$ and $c$.

The two parallel reflected beams $b$ and $c$ are spaced a distance $(x)$ which is a function of glass thickness $(t)$ index of refraction $(n)$ and angle of incidence ($\Phi$) of the projected beam. This function is indicated by the equation:

$$x = t \frac{\sin 2\phi}{(n^2 - \sin^2 \phi)^{1/2}} \qquad (1)$$

The spaced parallel beams are directed towards the rotating wheel having the elongated narrow slit therein. Thus, with the wheel rotating a constant velocity, the first and second reflected beams will pass through the slit to the photomultiplier at spaced timed intervals (T). The time in seconds between the arrival of these two beams at the photomultiplier is a function of the spacing ($x$ in inches) between the beams, the diameter ($d$ in inches) and angular velocity ($V$ in revolutions per second) of the wheel. This function is:

$$T = \frac{x}{\pi dV} \quad (2)$$

Substituting $x$ of equation 01 in equation 02, will result in the time of arrival between the two beams shown by the equation:

$$T = \frac{t \sin 2\phi}{dV\pi(n^2 - \sin^2 \phi)^{1/2}} \quad (3)$$

Figure 11:
FIG. 11 shows the form of pulses which are produced by the photomultiplier of FIG. 10.
Figure 12:
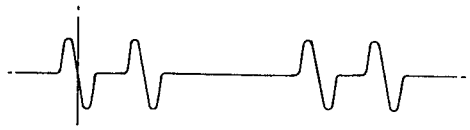
FIG. 12 shows the waveform produced by the differentiator of FIG. 10.
Figure 10:
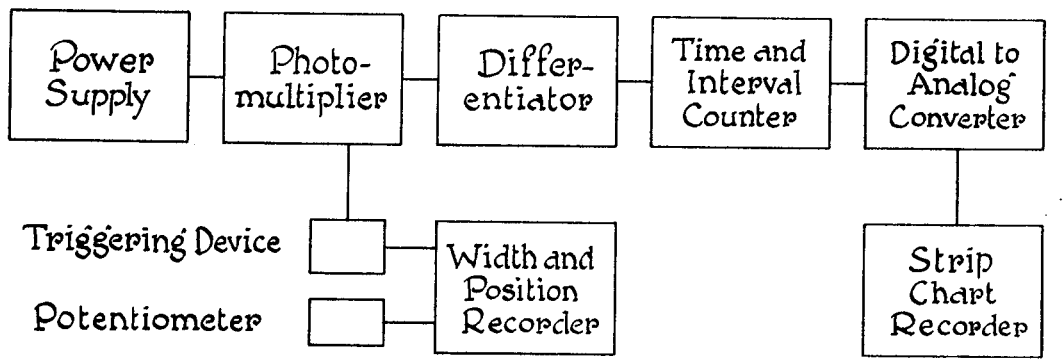
FIG. 10 is a block diagram of electrical apparatus which may be utilized for recording the output signals of the device.

By fixing the angle of incidence and the diameter and velocity of the wheel, the time spacing ($x$) between the electrical pulses out of photomultiplier is a direct function of the glass thickness ($t$) and its index of refraction ($n$). To reliably measure this time, the pulses are fed through a differentiator, shown in the block diagram of FIG. 10, which includes a capacitor and resistor suitably interconnected to convert the waveform of the pulses shown in FIG. 11 to the form shown in FIG. 12. As can be seen from FIGS. 11 and 12, by differentiating the output pulses, the peak of each pulse is located with respect to time, independent of the pulse's amplitude, which reduces errors occasioned by changes in pulse amplitude caused by, among other things, variations in light intensity of the respective beams.

By conventional logic circuitry, suitably interconnected, the time interval between the zero readings of the respective differentiated pulses may be converted into analog DC voltage suitable for recording on a strip chart recorder. Also, a commercially available time interval electronic counter may be connected to and triggered by the zero crossing of the respective differentiated pulses which will convert the time interval to digital information. This digital information may be converted to DC voltage by a commercially available digital to analog converter to be recorded by a strip chart recorder.

As can be seen by reference to equation 03 above, with a glass composition having a known index of refraction by appropriate selection of the wheel diameter and its angular velocity and the angle of incidence, the time in microseconds between pulses recorded on the strip chart recorder will be the glass thickness ($t$) in thousandths of an inch.

It has been found that with a glass composition having an index of refraction of 1.523, the optimum angle of incidence is 49°. This angle optimizes the spacing between the two reflecting beams and minimizes the change in beam spacing due to angular change in glass position with respect to the inspection device. With an angle of incidence of 49°, a wheel diameter of 3.975 inches and an angular velocity of 60 revolutions per second, the recorded time between the spacing of the pulses in microseconds will correspond to a glass thickness in thousandths of an inch.

Also, it is readily apparent from inspection of the above equation that the index of refraction of a transparent member of constant uniform thickness can be readily determined with the inspection device by fixing the angle of incidence and the angular velocity and diameter of the wheel.

As can be seen in FIG. 4, any distortion or variation in thickness of the glass ribbon due to nonparallel surfaces, will cause the reflected beams $b$ and $c$ to be nonparallel resulting in errors which will be increased as the distance of the detection apparatus from the ribbon surface is increased. In order to decrease the effect that the distortion (wedge) will have in determining thickness of the glass, the lens systems 62 and 63 are positioned between the near surface of the glass and the light source assembly and chopper assembly, respectively. Although either lens system may be located anywhere along the path of the light beam and the reflected beams, it has been found expedient to select lens systems having a focal length equal to one-half the distance between the near surface of the glass and the respective opaque members having the slits therein. By locating the lens systems with such focal lengths midway between the glass surface and the mask and the wheel having the slits, the respective slits will be imaged at the near surface of the glass. This procedure minimizes the error caused by wedge in the glass sheet which is very important if the device is to be used on glass that has an appreciable amount of wedge.

As is well known in the art of drawing glass, distortion or major variation in thickness generally occurs transverse to the path of movement to the glass ribbon being drawn. Therefore, by locating the length of the slit in the light source assembly and the shopper assembly transverse to the path of movement of the ribbon, variations in thickness due to distortion (wedge) will be further minimized because the recorded thickness will be average thickness along the length of the slit.

Also, it should be noted at this point, that the intense heat in the lehr of the furnace will cause changes in air density therein which in turn will result in a wavy pattern in the directed and reflected light beams. However, any errors which could result from changes in air density are eliminated by the speed at which the pairs of reflected beams are recorded.

This arrangement will allow the inspection device to be located a considerable distance from the surface of any glass that is of an optical quality which produces images that are sharp and clear, and still have accurate readings; for example, an accuracy of ±0.001 inches at a distance of 10 inches.

The traversing optical inspection device, constructed in accordance with this invention, may also be provided with means for indicating the width and position of the moving glass ribbon within the lehr of the glassmaking machine. To this end, there is provided a potentiometer 161, mounted to and driven by the output shaft 162 of the gearbox 148 by a chain belt 163. A housing 164 may be provided to enclose the belt and associated driving mechanism.

The output voltage signal of the potentiometer may be utilized to drive a suitable recording mechanism. By way of example, the width- and position-recording mechanism may include a recorder having a pen spaced from the paper, driven by the output signal of the potentiometer, with a suitable connection for receiving selected output pulses from the photomultiplier 140 of the optical inspection device.

As can be readily appreciated, the inspection device, or more appropriately the photomultiplier, will not produce any output signals during times in which there is no glass ribbon under the area of the lehr above which the device is located. By appropriate triggering apparatus, the first pulse produced by the photomultiplier, when the first beams are reflected from the glass ribbon, is fed to the position and width recorder to trigger the pen driven by the potentiometer moving it in contact with the paper and therefore marking the position of the first side of the glass ribbon.

As the optical inspection device moves to the opposite side of the lehr, it will move beyond the second edge of the glass ribbon and as such no further reflected beams will be received by the photomultiplier. Upon reaching the extreme opposite side, the direction of the inspection device will be reversed by the limit switch 160, and the device will move toward the second edge of the glass ribbon. When the traversing inspection device moves above the second edge of the moving glass ribbon, the reflected beams will again be received by the photomultiplier producing pulses therefrom. The first of these pulses may be fed to the position and width recorder to trigger the moving pen and move it in contact with the recording paper to mark and locate the second side of the glass ribbon.

The two marks made by the moving pen as it is triggered from respective first pulses received from the photomultiplier will indicate the width of the glass ribbon. By having the pen, which is being driven by the potentiometer stopped during a time interval when the inspection device is traversing the central portion of the lehr, for example, the central 90 inches, this area will be suppressed on the recording paper and the edges will be expanded to increase the accuracy of the recording.

Also, by appropriate adjustment of the recorder, the respective sides of the paper will correspond to the respective edge portions of the ribbon in the lehr. As such the position of the ribbon in the lehr can be determined from the location of the respective marks on the recording paper.

Although the inspection device has been disclosed as being mounted in the hot end of an annealing lehr of a glassmaking machine, it is obvious that the same installation may be made anywhere along the length of the lehr, for example, at the cold end thereof. Furthermore, the inspection device may be utilized for triggering appropriate marking devices which will produce a spot of colored ink on the glass surface if the glass is less than a certain desired thickness and a second colored spot indicating a glass thickness more than that desired.

It is to be understood that the forms of the invention herewith shown and described are to be taken as illustrative embodiments only of the same, and that various changes in the shape, size and arrangement of parts may be resorted to without departing from the spirit of the invention.

We claim:

1. Apparatus for measuring the thickness of a transparent member having near and far spaced optical surfaces, comprising:
   a. means for directing a relatively narrow beam of light toward said near surface at an angle incident to produce first and second reflected beams from said near and far surfaces;
   b. light responsive detection means positioned in the path of said reflected beams;
   c. constant rate chopping means also in said path, including means for repeatedly interrupting said reflected beams and allowing said first and second reflected beams to successively impinge on said detection means, with the interval between impingement of said first and second beams on said detection means being indicative of the thickness of said transparent member; and
   d. lens means interposed between said chopping means and said near surface to image said means for interrupting said beams at said near surface.

2. Apparatus for measuring the thickness of a transparent member having near and far spaced optical surfaces, comprising:
   a. a light source;
   b. an opaque member having a slit therein for projecting a restricted linear beam of light from said source towards said member at an angle to produce first and second spaced reflected beams from said surfaces;
   c. a first lens means positioned in the path of said beam to image said slit of light of said opaque member at said near surface of said transparent member;
   d. detection means positioned in the path of said reflected beams;
   e. constant rate chopping means adjacent said detection means, including means for repeatedly interrupting said reflected beams and allowing said first and second reflected beams to successively impinge on said detection means, with the interval between impingement of said first and second beams on said detection means being indicative of the thickness of said transparent member;
   f. lens means interposed between said chopping means and said near surface to image said means for interrupting said beams at said near surface.

3. Apparatus for measuring the thickness of a transparent member having near and far spaced optical surfaces, comprising:
   a. a casing having a light source mounted therein;
   b. means secured to said casing for directing a restricted beam of light from said source in a first direction;
   c. a first adjustable mirror assembly secured to said casing in the path of said beam to direct said beam towards the near surface of said transparent member, at an angle incident to produce first and second spaced reflected beams from said surfaces;
   d. a second adjustable mirror assembly secured to said casing and positioned in the path of said reflected beams to direct said reflected beams in a second direction;
   e. detection means secured to said casing and positioned in the path of said reflected beams directed in said second direction;
   f. constant rate chopping means including means repeatedly interrupting said reflected beams and allowing said first and second reflected beams to successively impinge on said detection means in timed relation with the interval between impingement of said first and second beams on said detection means being indicative of said transparent member thickness; and
   g. lens means positioned in the path of said reflected beams between said means and said near surface to image said means interrupting said beams at said near surface.

4. Apparatus as defined in claim 1, wherein said incident angle is substantially 49°.

5. Apparatus as defined in claim 1, wherein said chopping means includes:
   a. an opaque wheel surrounding said detection means and having an elongated slit therein; and
   b. means for rotating said wheel at a constant velocity.

6. In combination with an annealing lehr having a glass ribbon with spaced optical surfaces supported for movement therein;
   a. an inspection device;
   b. means for supporting said device for movement on said lehr; and
   c. driving means for traversing said device on said lehr;
   said inspection device comprising:
   1. means projecting a restricted light beam onto said ribbon, incident at an angle to produce spaced reflected beams from said spaced optical surfaces;
   2. a light detector electrically responsive to said reflected beams;
   3. means positioned in the path of said reflected beams to interrupt said reflected beams at a rate proportionate to the spacing between said spaced optical surfaces and selectively allow said spaced reflected beams to impinge on said detector producing spaced pulses; and
   4. a lens assembly positioned in the path of said reflected beams between said last-mentioned means and said glass ribbon surface.

7. In combination with an annealing lehr having a glass ribbon with spaced optical surfaces supported for movement therein:
   a. an inspection device;
   b. means for supporting said device for movement on said lehr; and
   c. driving means for traversing said device on said lehr;
   said inspection device comprising:
   1. means projecting a restricted light beam onto said ribbon, incident at an angle to produce spaced reflected beams from said spaced optical surfaces;
   2. a light detector electrically responsive to said reflected beams;
   3. means positioned in the path of said reflected beams to interrupt said reflected beams at a rate proportionate to the spacing between said spaced optical surfaces and selectively allow said spaced reflected beams to impinge on said detector producing spaced pulses, said last-mentioned means comprising a tubular opaque member having an elongated narrow slit therein and surrounding said detector, and means for rotating said tubular member; and
   4. a lens assembly positioned in the path of said reflected beams between said last-mentioned means and said glass ribbon surface.

8. In combination with an annealing lehr having a glass ribbon with spaced optical surfaces supported for movement therein:
   a. an inspection device;

b. means for supporting said device for movement on said lehr;

c. driving means for traversing said device on said lehr; and d. a width and position indicator;

said inspection device comprising:

1. means projecting a restricted light beam onto said ribbon, incident at an angle to produce spaced reflected beams from said spaced optical surfaces;

2. a light detector electrically responsive to said reflected beams; and

3. means positioned in the path of said reflected beams to interrupt said reflected beams at a rate proportionate to the spacing between said spaced optical surfaces and selectively allow said spaced reflected beams to impinge on said detector producing spaced pulses;

said width and position indicator comprising:

1. electric means, driven by said driving means, producing an output signal; and 2. recording means having means driven by said signal, and means connected to said detector to convey selected pulses produced by said detector to said recording means to indicate the width and position of said ribbon moving in said lehr.

9. In combination with an annealing lehr of a glassmaking machine having a glass ribbon with near and far spaced optical surfaces supported for movement therein:

a. an inspection device supported for movement on said lehr;

b. driving means for traversing said device on said lehr;

said inspection device comprising:

1. a light source;

2. means adjacent said light source for projecting a restricted beam of light in a first direction;

3. a first mirror assembly positioned in the path of said projected beam to direct said beam towards said glass ribbon, incident at an angle to produce spaced reflected beams from said spaced optical surfaces;

4. a second mirror assembly positioned in the path of said spaced reflected beams to direct said reflected beams in a second direction; and 5. a chopper assembly positioned in the path of said reflected beams;

said chopper assembly including:

a. detection means positioned to receive said reflected beams; and b. means to interrupt said reflected beams at a rate proportionate to the spacing between said spaced optical surfaces and selectively allow said spaced reflected beams to impinge on said detector producing spaced pulses.

10. A combination as defined in claim 9, wherein said chopper assembly includes:

a. constant velocity chopping means interposed in the path of said reflected beams adjacent said detection means including means to allow said reflected beams to selectively impinge on said detection means, thereby producing said spaced pulses; and b. lens means interposed in the path of said reflected beams between said chopping means and said near surface to image said means allowing selective impingement of said beams on said detection means at said near surface of said glass ribbon.

11. A combination as defined in claim 9, including means for differentiating said spaced pulses to locate the peaks of said pulses independent of pulse amplitude.